US009747147B2

(12) United States Patent
Chowdhary

(10) Patent No.: US 9,747,147 B2
(45) Date of Patent: *Aug. 29, 2017

(54) ERROR SOURCE IDENTIFICATION ON TIME-OF-DAY NETWORK

(71) Applicant: International Business Machines Corporation, Armonk, NY (US)

(72) Inventor: Manish Kumar Chowdhary, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/870,238

(22) Filed: Sep. 30, 2015

(65) Prior Publication Data

US 2016/0299810 A1 Oct. 13, 2016

Related U.S. Application Data

(63) Continuation of application No. 14/682,621, filed on Apr. 9, 2015.

(51) Int. Cl.
*G06F 11/00* (2006.01)
*G06F 11/07* (2006.01)
*H04L 12/26* (2006.01)

(52) U.S. Cl.
CPC ........ *G06F 11/0757* (2013.01); *G06F 11/079* (2013.01); *G06F 11/0724* (2013.01); *G06F 11/0772* (2013.01); *H04L 43/0864* (2013.01)

(58) Field of Classification Search
CPC .............. G06F 11/079; G06F 11/0772; G06F 11/0757; G06F 11/0709; H04L 43/0864

USPC ......................................................... 714/11
See application file for complete search history.

(56) References Cited

U.S. PATENT DOCUMENTS

| 9,450,846 | B1* | 9/2016 | Huang | H04L 43/0858 |
| 2006/0184840 | A1* | 8/2006 | Floyd | G06F 11/0724 |
| | | | | 714/48 |
| 2009/0172461 | A1* | 7/2009 | Bobak | G06F 11/0709 |
| | | | | 714/2 |

OTHER PUBLICATIONS

Appendix P "IBM Patent and Patent Applications Treated as Related" filed Sep. 30, 2015; pp. 2.
U.S. Appl. No. 14/682,621, filed Apr. 9, 2015 entitled "Error Source Identification on Time-of-Day Network".

* cited by examiner

*Primary Examiner* — Yair Leibovich
(74) *Attorney, Agent, or Firm* — Maeve Carpenter

(57) ABSTRACT

In an approach to identifying a source of a time-of-day network error, one or more computers increment a first counter and a second counter on each of one or more computer processors simultaneously. The one or more computers determine whether an error is detected in the one or more computer processors. In response to determining the error is detected, the one or more computers freeze the second counter on the one or more computer processors associated with the detected error. The one or more computers determine on which of the one or more computer processors the second counter is frozen. The one or more computers report a time-of-day network error, where reporting a time-of-day network error includes assigning a priority to one or more sources of the time-of-day network error.

9 Claims, 4 Drawing Sheets

ERROR SOURCE IDENTIFICATION ON TIME-OF-DAY NETWORK

BACKGROUND OF THE INVENTION

The present invention relates generally to the field of computer systems, and more particularly to error source identification on a time-of-day network.

Accurate timing is important to operating systems and hypervisors for workload management, and generally maintaining order of various events throughout a system. All processors in a symmetric multiprocessor system (SMP) must appear to have the same time. The processors are coupled by means of fabric buses that cooperate to process transactions for a shared resource, and hence require that the time-of-day (TOD) clocks on the processors be consistent to ensure the integrity of transaction data (i.e., time stamps accurately reflect the sequence of events). The TOD facility provides this capability by substituting a single "step" signal (from a designated "master" chip) for the individual TOD-clock-stepping signal oscillators in each chip. This eliminates variations caused by differences in TOD-clock-stepping rates. A "sync" signal from the "master" chip enables starting the TOD clock in each "slave" chip in synchronization with the master system, as well as continuously checking that this synchronization is being maintained. The step signal is generally generated from an external oscillator source, and the sync signal is generated by counting a certain number of steps.

When timing errors occur, it is important for diagnostics firmware to be able to analyze the system and determine with certainty the primary source of the error so appropriate action can be taken. Corrective actions may include repair of a component, de-configuration of selected resources to prevent the use of the selected resources, and/or a service call for replacement of a defective component if the component is a field replaceable unit that can be replaced with a fully operational unit.

SUMMARY

Embodiments of the present invention disclose a method and a system for identifying a source of a time-of-day network error. The method may include one or more computers incrementing a first counter and a second counter on each of one or more computer processors simultaneously. The one or more computers determine whether an error is detected in the one or more computer processors. In response to determining the error is detected, the one or more computers freeze the second counter on the one or more computer processors associated with the detected error. The one or more computers determine on which of the one or more computer processors the second counter is frozen. The one or more computers report a time-of-day network error, wherein reporting a time-of-day network error includes assigning a priority to one or more sources of the time-of-day network error.

DETAILED DESCRIPTION

Each processor in a symmetric multiprocessor system (SMP) system includes hardware logic responsible for maintaining a time-of-day (TOD) clock register implemented as a monotonically non-decreasing counter. The counter is synchronized across all processors. A system designer achieves the synchronization by collaboration of hardware logic and firmware code. Firmware creates a TOD topology. TOD topology defines a signal propagation path where a master processor creates a "step" signal from an incoming oscillator feed and sends the signal to all the slave processors in the system for incrementing the slave counters. In order to ensure that all counters are incremented simultaneously, each processor includes a delay mechanism to compensate for propagation delay on distribution lines. Step signals are checked along the data path to detect problems with the incoming signal. A step checker reports an error in a TOD network if there is a deviation in the cycles per step (CPS) between two steps. Such an error, known as a step check error, can occur due to a problem with the oscillator, a problem with the bus that brings a signal to a processor, or an error in the signal path within a processor. When a step check error occurs along the path that brings the oscillator signal to the master processer, the error is known as a master path step check error. When a step check error occurs along the path that brings signals from the master processor to a slave processor, or from one slave processor to another slave processor, the error is known as a slave path step check error. When a step check error occurs on an internal path within a processor, the error is known as an internal path step check error.

Embodiments of the present invention recognize that identification of a source of a step check error may be performed precisely and in a simplistic manner by including a second counter within a processor that freezes upon detection of an error by a step checker, enabling the system firmware to identify a root cause of the error, and recommend a corrective action. Implementation of embodiments of the invention may take a variety of forms, and exemplary implementation details are discussed subsequently with reference to the Figures.

Figure 1:
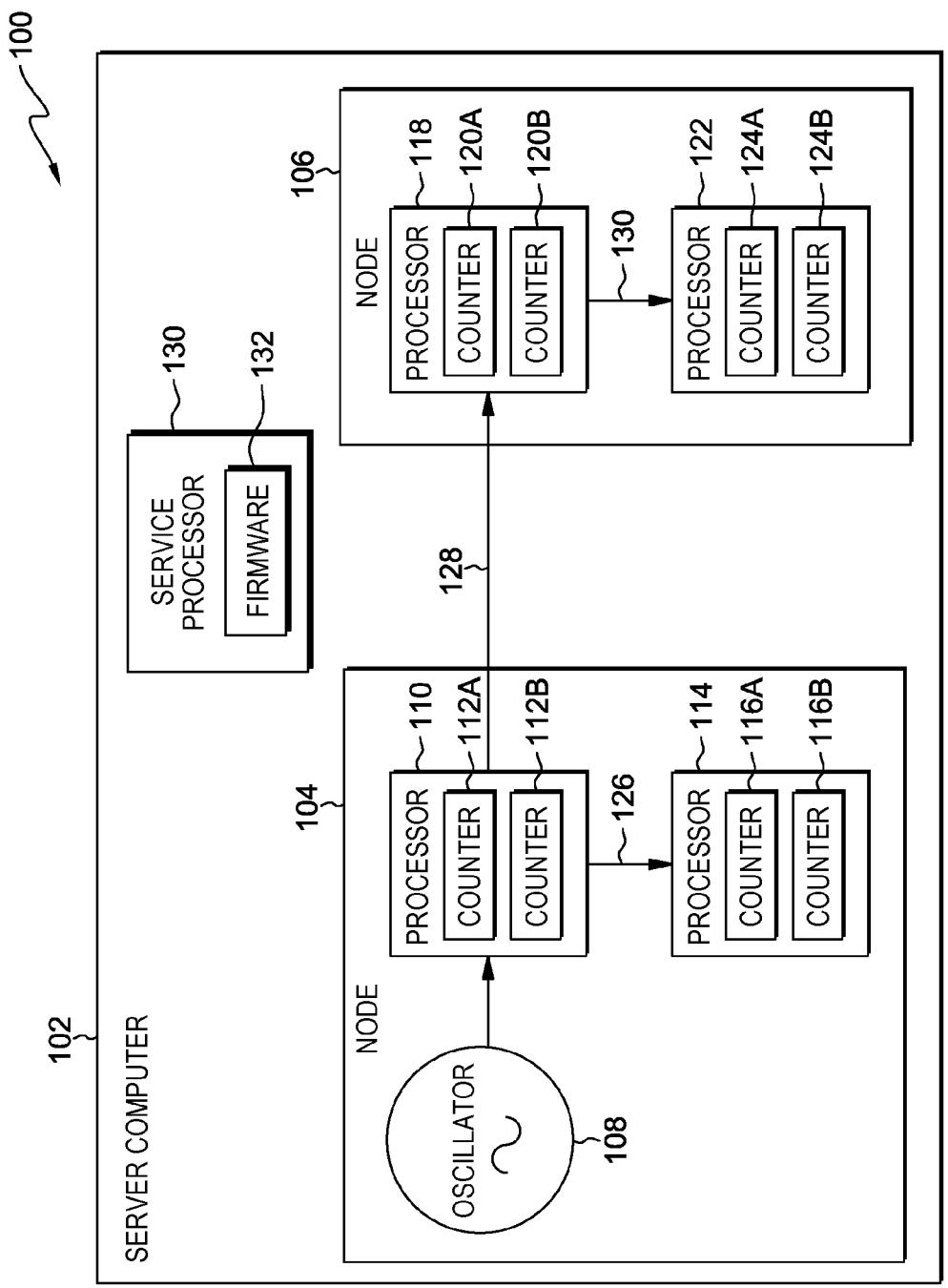
FIG. 1 is a functional block diagram illustrating a distributed computer system environment, in accordance with an embodiment of the present invention.

FIG. 1 is a functional block diagram illustrating a distributed computer system environment, generally designated 100, in accordance with one embodiment of the present invention. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed computer system environment 100 includes server computer 102. Server computer 102 can be a stand-alone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a personal digital assistant (PDA), a smart phone, or any programmable electronic device capable of communicating with other computing devices (not shown) within distributed computer system environment 100. In another embodiment, server computer 102 represents a computing system utilizing clustered computers and components (e.g., database server computers, application server computers, etc.) that act as a single pool of seamless resources when accessed within distributed computer system environment 100. Server computer 102 includes node 104, node 106, and service processor 130. Server computer 102 may include internal and external hardware components, as depicted and described in further detail with respect to FIG. 4.

Each of nodes 104 and 106 is a processing device that executes user applications and is contained in server computer 102. Each such node may be a web server, a database, or any other computing device. The embodiment illustrated in FIG. 1 depicts each node containing two processors (i.e., processors 110 and 114 of node 104 and processors 118 and 122 of node 106). In addition, node 104 includes oscillator 108. In one embodiment, a node may include more than one oscillator. In another embodiment, each node may include one or more oscillators. In a further embodiment, an oscillator can be present elsewhere in server computer 102. Although not all shown in FIG. 1, nodes may include any number of devices such as additional computer processors, additional computer memory, disk drive adapters, disk drives, communication adapters, bus adapters, and so on as known to those of skill in the art. As depicted in FIG. 1, server computer 102 is configured with two nodes (104 and 106), but those of skill in the art will recognize that computer systems useful in administering a TOD network according to embodiments of the present invention may include any number of nodes.

Service processor 130 is a separate computer system within server computer 102 that enables service tasks. Service tasks include, but are not limited to, booting one or more processors, running diagnostics on the hardware components of server computer 102, analyzing errors, system reset or reboot, etc. In one embodiment, service processor 130 includes program instructions stored on one or more computer readable storage media for execution by one or more computer processors. In another embodiment, service processor 130 includes firmware 132. In general, firmware is software instructions, or code, that runs on a service processor in order to achieve the service processor functionalities described above. Firmware 132 includes the ability to analyze errors and determine one or more likely sources of an error. In a TOD network, firmware 132 creates a TOD topology, triggers TOD hardware logic to start, and analyzes any errors which the TOD hardware logic directs toward firmware 132.

The embodiment illustrated in FIG. 1 depicts each processor containing two counters (e.g., counters 112A and 112B of processor 110, etc.). Each counter simultaneously counts the time in specified increments. For example, a counter may count the time in nanoseconds. In the instant that the TOD logic in the processor detects a step check error, the TOD logic freezes one of the two counters to establish a value of time that the error occurred.

The propagation of signals through the TOD network occurs via a TOD signal propagation hierarchy as defined by the TOD topology, configured by firmware 132. In the depicted embodiment, processor 110 in node 104 is designated as the master drawer master TOD chip (MDMT). Because processor 110 is designated as the MDMT, oscillator 108 feeds input signals to processor 110. Step generation logic on processor 110 generates step signals from the oscillator signals and sends the step signals to the remaining processors. A plurality of data pathways or buses allows communications between adjacent processors in the topology. Processor 110 feeds signals to master drawer slave TOD chips (MDST) on the same node, i.e., processor 114, via bus 126. Processor 110 also feeds signals to slave drawer master TOD chips (SDMT) on one or more other nodes, for example, processor 118 on node 106, via bus 128. Processor 118 propagates signals to slave drawer slave TOD chips (SDST) within node 106, i.e. processor 122, via bus 130. The TOD hardware logic is designed to maintain an active topology and a redundant, or backup, topology for purposes of reliability. Errors detected in the active topology initialize a switch to the backup topology. For illustrative purposes, the following discussion is made with respect to processor 110 serving as a master processor and processors 114, 118, and 122 as slaves, however it should be understood that in other embodiments of the present invention any of the processors 110, 114, 118, and 122 can serve as a master and the other processors can serve as slaves.

Figure 2:
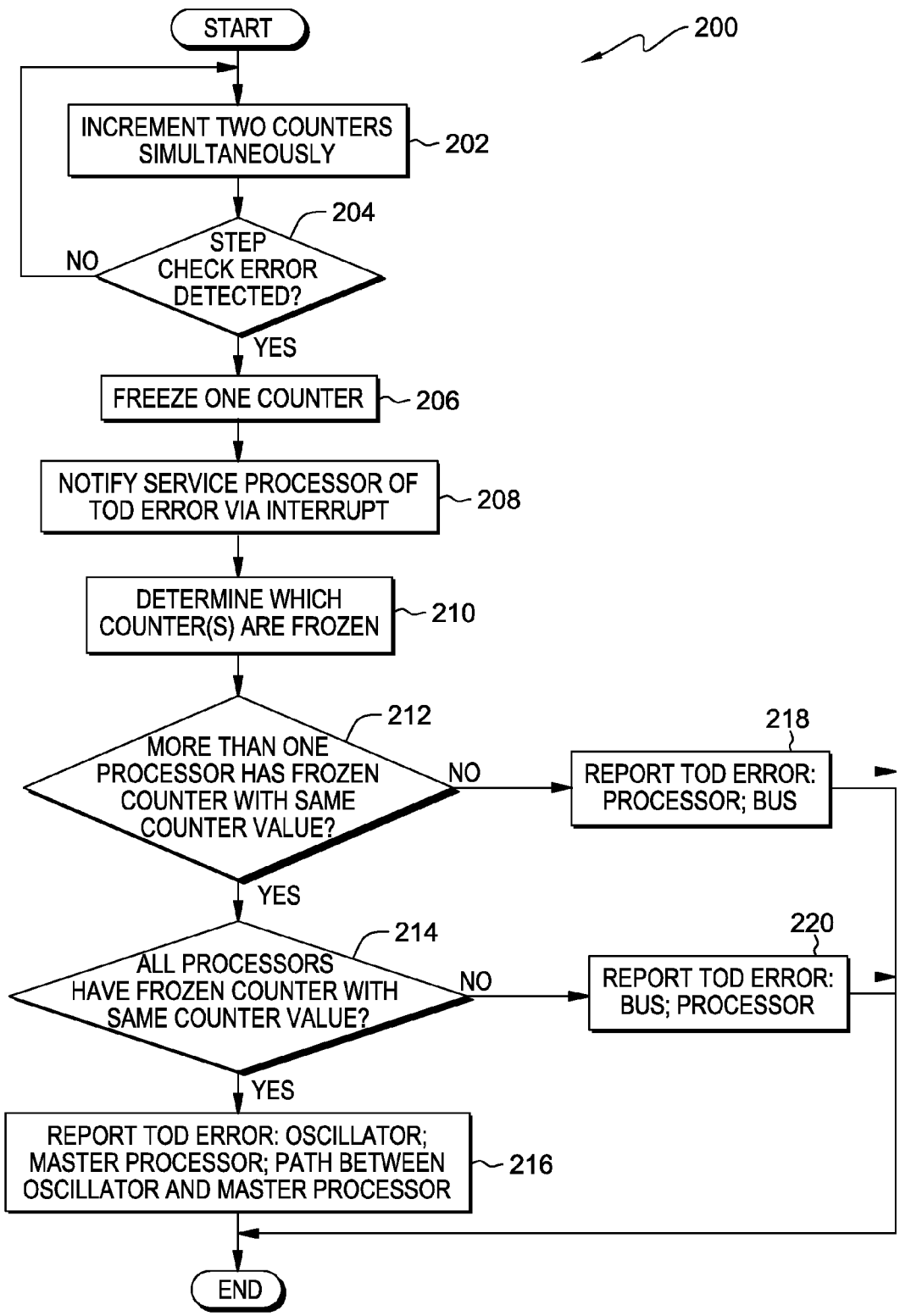
FIG. 2 is a flow diagram depicting the intercommunications of components on a server computer within the distributed computer system environment of FIG. 1, for identifying the source of an error in a time-of-day (TOD) network, in accordance with an embodiment of the present invention.

FIG. 2 is a flow diagram depicting the intercommunications of components on server computer 102 within distributed computer system environment 100 of FIG. 1, for identifying the source of an error on a TOD network, in accordance with an embodiment of the present invention.

Flow diagram 200 begins with the processors of server computer 102 incrementing two counters simultaneously (step 202). TOD logic within each processor of server computer 102 increments the two counters on each processor, for example, counters 112A and 112B on processor 110, counters 116A and 116B on processor 114, counters 120A and 120B on processor 118, and counters 124A and 124B on processor 122, as depicted with respect to FIG. 1. In one embodiment, initialization of the counters with an actual time of day on each of the processors occurs via a series of steps driven by the TOD hardware logic prior to the master processor, i.e., processor 110, transmitting step signals to the counters.

Step checker logic within each processor determines whether a step check error is detected (decision block 204). Step checker logic checks the step signals along a data path to detect any problems with the incoming signal. The step checker logic counts the number of cycles per step signal and validates whether the number corresponds to the pre-defined step period within a pre-defined tolerance. If no step check error is detected ("no" branch, decision block 204), then the processors of server computer 102 continue to increment the two associated counters simultaneously.

If a step check error is detected ("yes" branch, decision block 204), then the one or more processors of server computer 102 that detected the step check error freeze one of the associated counters (step 206). By freezing the value of one of the two counters associated with the particular processor(s) that detects a step check error at the instant the step check error is detected, the processor preserves the state of the hardware and enables improved failure analysis. For example, if processor 110 detects a step check error, then processor 110 may freeze counter 112B, but not counter 112A. In one embodiment, one counter is designated as the primary counter while the other counter is designated as the backup counter. As will be discussed with respect to FIG. 3, the backup counter is logically coupled to an error status register and is the counter that is frozen upon detection of a step check error. Although one of the two counters is frozen, processing on server computer 102 continues. A backup TOD topology immediately takes over and continues to supply valid step signals.

Responsive to freezing one counter, the TOD hardware notifies service processor 130 of a TOD error via an interrupt (step 208). An interrupt is a signal to a processor emitted by hardware or software indicating an event that needs immediate attention. An interrupt alerts a processor to a high-priority condition requiring the interruption of the current code the processor is executing. When service processor 130 receives the interrupt, service processor 130 invokes the routines of firmware 132 to handle the interrupt.

Firmware 132 determines which counter(s) are frozen (step 210). Firmware 132 is responsible for analyzing errors in the TOD network, such as step check errors, and determining sources of the errors. In an effort to determine the source of the step check error, in one embodiment, firmware 132 analyzes one or more TOD error registers, determines a step check error has occurred and confirms that a counter is frozen. In another embodiment, firmware 132 reads the TOD counters twice. If the value of a counter is the same when firmware 132 reads the counter the second time, then firmware 132 determines the counter is frozen.

Firmware 132 determines whether more than one processor in the TOD signal propagation hierarchy has a frozen counter with the same counter value (decision block 212). In one embodiment, firmware 132 analyzes each of the counter values of all of the frozen counters within in the TOD signal propagation hierarchy to determine whether more than one of the processors have a frozen counter that matches the value of a frozen counter on another processor. For example, firmware 132 determines the value of counter 112B on processor 110 is frozen and compares the value of counter 112B to any corresponding frozen counters on processors 114, 118, and 122 to determine whether the value of any of the other counters in the TOD network matches the value of counter 112B. In the depicted embodiment, all processors belong to the same hierarchy, as all the slave processors are related to the same master processor. In an embodiment where not all TOD network processors belong to the same hierarchy, then firmware 132 determines whether more than one processor has a frozen counter with the same counter value in addition to sharing a branch in a hierarchy, where sharing a branch in a hierarchy refers to one of the processors with a frozen counter being the source of step signals to the remaining processors with frozen counters. In one embodiment, if firmware 132 determines more than one processor has a frozen counter, but the frozen counters do not have the same counter value, then firmware 132 indicates that the error is most likely associated with each processor with a frozen counter.

If more than one processor in the TOD signal propagation hierarchy has a frozen counter with the same counter value ("yes" branch, decision block 212), then firmware 132 determines whether all of the processors in the TOD signal propagation hierarchy have a frozen counter with the same counter value (decision block 214).

If all of the processors in the TOD signal propagation hierarchy have a frozen counter with the same counter value ("yes" branch, decision block 214), then firmware 132 reports a TOD error with the following components as a probable source: oscillator, master processor, path between the oscillator and the master processor (step 216). Firmware 132 includes a mechanism to assign priorities to detected errors. In one embodiment, a firmware designer decides the priority of likely failure mechanisms based on hardware characteristics and past failure data. If all of the processors in the TOD network have received a signal in error at the same time, then the highest priority of root cause is the oscillator generating the step signals, i.e., oscillator 108. Both the master processor, i.e., processor 110, and the path between oscillator 108 and processor 110 are low priority, but may also be the root cause of the error.

If only one processor in the TOD signal propagation hierarchy has a frozen counter ("no" branch, decision block 212), then firmware 132 reports a TOD error with the following priority: a slave processor, a bus that communicates to the slave processor (step 218). If only one processor has a frozen counter, firmware 132 indicates that the error is most likely associated only with the processor that experienced the error. The highest priority of root cause is the slave processor with the frozen counter. If the processor with the frozen counter is the lowest slave processor in the TOD signal propagation hierarchy, then the bus communicating between the slave processor with a frozen counter and a processor immediately ahead of the slave processor with a frozen counter in the TOD signal propagation hierarchy is a low priority, but may also be the root cause of the error. For example, if processor 122 is the only processor with a frozen counter, then most likely the source of the error is within processor 122. Although less likely, bus 130 may also be the source of the error because processor 122 is the last processor in the TOD signal propagation hierarchy.

If more than one processor in the TOD signal propagation hierarchy has a frozen counter with the same counter value, but not all of the processors in the TOD signal propagation hierarchy have a frozen counter with the same counter value ("no" branch, decision block 214), then firmware 132 reports a TOD error with the following priority: a bus that communicates to more than one slave processor, a slave processor (step 220). If more than one, but not all, processors have a frozen counter with the same counter value, and each of the processors belong to the same branch of the TOD signal propagation hierarchy, i.e., one of the processors with a frozen counter is the source of step signals to the remaining processors with frozen counters, then firmware 132 determines that, of the slave processors with matching frozen counter values, the processor most likely to be associated with the source of the error is the slave processor that is topmost in the TOD signal propagation hierarchy. Firmware 132 indicates that the highest priority of root cause is associated with a bus that communicates to the processor topmost in the TOD signal propagation hierarchy. The slave processor that is topmost in the TOD signal propagation hierarchy is a low priority, but may also be the root cause of the error. For example, if firmware 132 determines that processor 118 and processor 122 both have a frozen counter, then firmware 132 determines the highest priority of root cause is bus 128 because processor 118 is topmost in the TOD signal propagation hierarchy (between processor 118 and processor 122), and bus 128 is the bus that communicates with processor 118.

Although several scenarios of TOD errors have been presented with respect to FIG. 2, one or more additional scenarios may occur. In scenarios not presented above, the source of a TOD error may not be a single point of failure, however a presence of a frozen counter in the TOD network enables an efficient root cause analysis.

Figure 3:
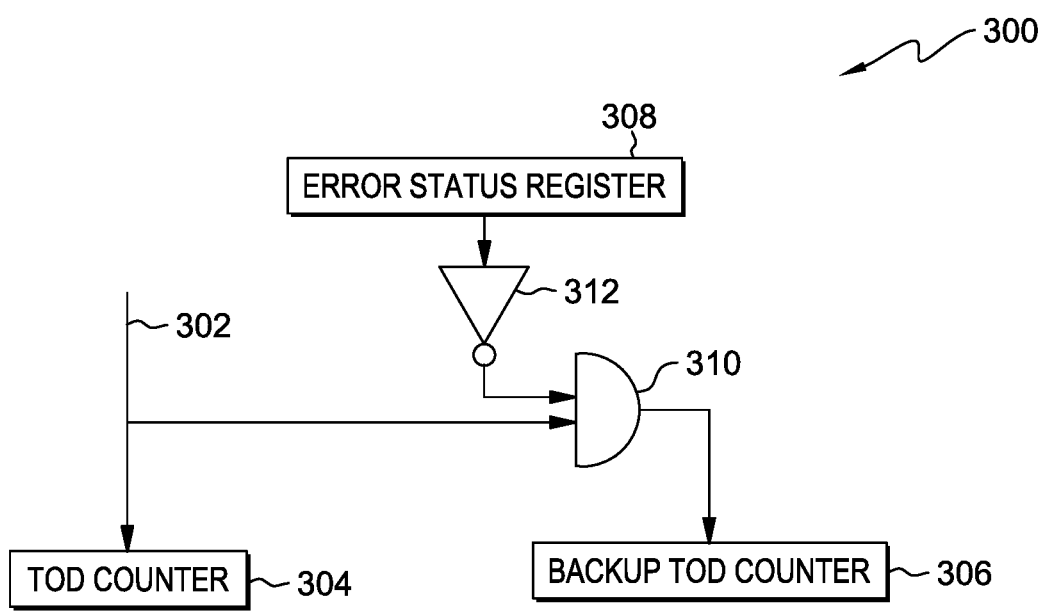
FIG. 3 depicts an example of a hardware arrangement for freezing a counter on detection of an error, on the server computer within the distributed computer system environment of FIG. 1, in accordance with an embodiment of the present invention.

FIG. 3 depicts an example of a hardware arrangement for freezing a counter on detection of an error on server computer 102, within distributed computer system environment 100 of FIG. 1, in accordance with an embodiment of the present invention.

In diagram 300, either an oscillator or a processor, depending on the TOD signal propagation hierarchy, propagates step signal 302 to TOD counter 304 and backup TOD counter 306. When no error is detected, TOD counter 304 and backup TOD counter 306 remain in sync. Backup TOD counter 306 is "frozen" when a step check error is detected. That is, when a step check error bit in error status register 308 has stored therein a logical "one," inverter 312 converts the logical "one" to a logical "zero" value. Therefore the output of AND gate 310 holds the clock input of backup TOD counter 306 to a logical "zero" value, and blocks any additional inputs to backup TOD counter 306. Backup TOD counter 306 then identifies the time the processor associated with TOD counter 304 and backup TOD counter 306 encountered an error.

Figure 4:
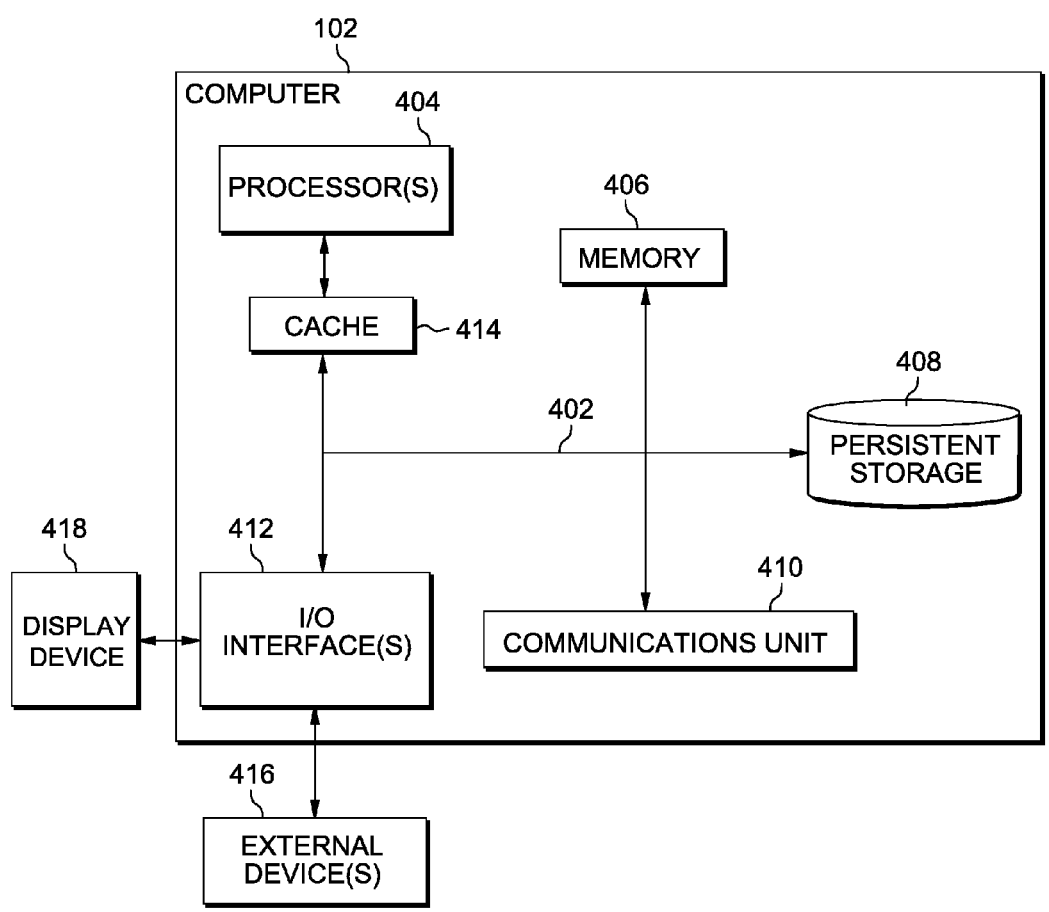
FIG. 4 depicts a block diagram of components of the server computer within the distributed computer system environment of FIG. 1, in accordance with an embodiment of the present invention.

FIG. 4 depicts a block diagram of components of server computer 102 within distributed computer system environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 102 includes processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server computer 102. In these examples, communications unit 410 includes one or more network interface cards. Communications unit 410 may provide communications through the use of either or both physical and wireless communications links.

I/O interface(s) 412 allows for input and output of data with other devices that may be connected to server computer 102. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media, for example, devices such as thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display device 418.

Display device 418 provides a mechanism to display data to a user and may be, for example, a computer monitor. Display device 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for identifying a source of a time-of-day network error, the method comprising:
   incrementing a first counter and a second counter on each of one or more computer processors simultaneously;
   determining whether an error is detected in the one or more computer processors;
   responsive to determining the error is detected, freezing the second counter on the one or more computer processors associated with the detected error and notifying a service processor of the error via a system interrupt, wherein the service processor is one of the one or more computer processors;
   determining on which of the one or more computer processors the second counter is frozen; and reporting a time-of-day network error, wherein reporting a time-of-day network error includes assigning a priority to one or more sources of the time-of-day network error;

wherein the steps described above are performed by the one or more computer processors.

2. The method of claim 1, wherein reporting the time-of-day network error further comprises, responsive to determining on which of the one or more computer processors the second counter is frozen, determining that only a first computer processor of the one or more computer processors includes a frozen second counter.

3. The method of claim 2, wherein the assigned priority of the one or more sources of the time-of-day network error is a) the first computer processor, and b) a bus between the first computer processor and a second computer processor, wherein the first computer processor is a lowest computer processor in a time-of-day signal propagation hierarchy.

4. The method of claim 1, wherein reporting the time-of-day network error further comprises:

responsive to determining on which of the one or more computer processors the second counter is frozen, determining whether more than one of the one or more computer processors includes a frozen second counter, wherein each frozen second counter value of the more than one of the one or more computer processors is the same; and responsive to determining that more than one computer processor of the one or more computer processors includes a frozen second counter, determining that each of the one or more computer processors in the time-of-day network includes a frozen second counter, wherein one of the one or more computer processors is a master processor.

5. The method of claim 4, wherein the assigned priority of the one or more sources of the time-of-day network error is a) an oscillator, b) the master processor, and c) a path between the oscillator and the master processor, wherein the oscillator feeds one or more signals to the master processor.

6. The method of claim 4, wherein reporting the time-of-day network error further comprises, determining that each of the one or more computer processors in the time-of-day network does not include a frozen second counter, wherein each frozen second counter value is the same.

7. The method of claim 6, wherein the assigned priority of the one or more sources of the time-of-day network error is a) a bus that communicates to a slave processor that is topmost in the time-of-day signal propagation hierarchy of the one or more processors that include a frozen second counter, and b) the slave processor that is topmost in the time-of-day signal propagation hierarchy of the one or more processors that include a frozen second counter.

8. The method of claim 6, wherein the one or more computer processors that include a frozen second counter share a branch of a time-of-day signal propagation hierarchy.

9. The method of claim 1, wherein the error is a time-of-day signal propagation error.

* * * * *